Figure 1:
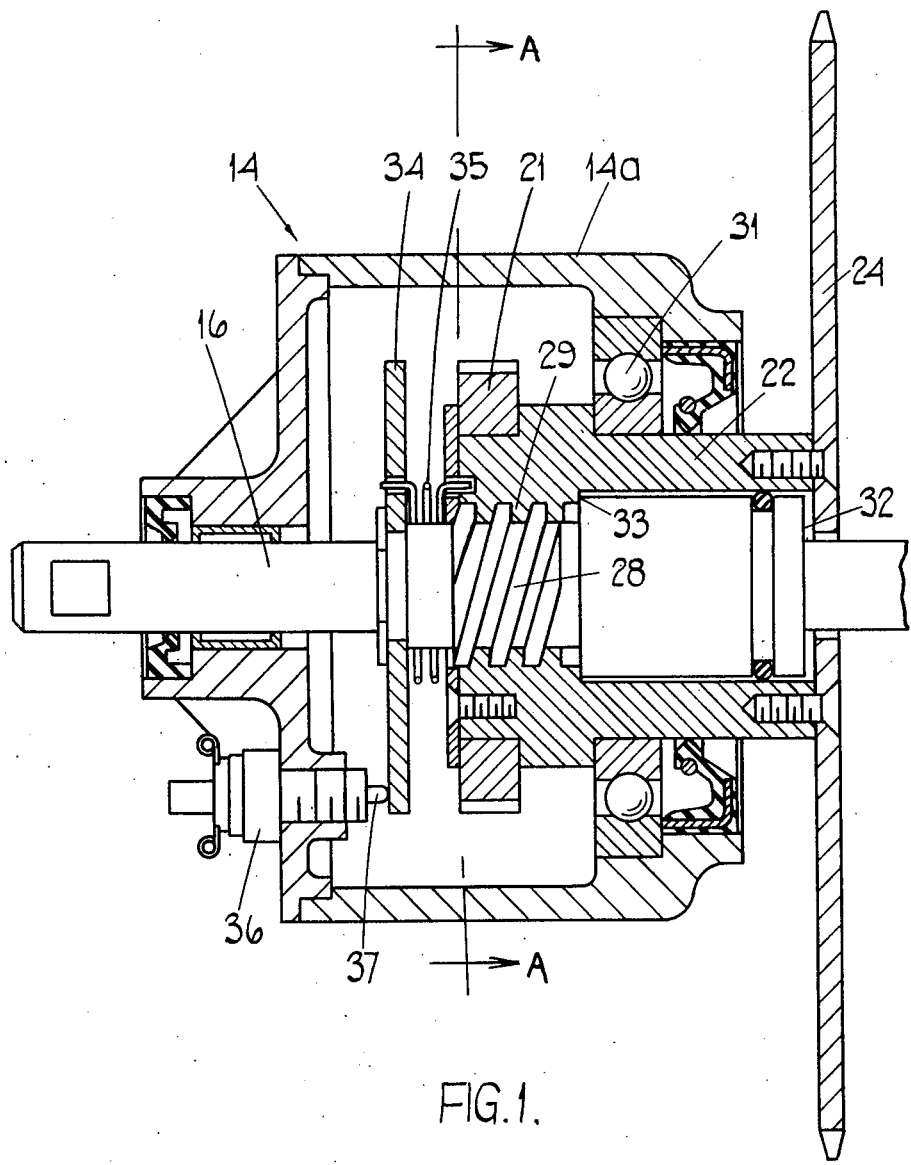

United States Patent [19]

Leighton et al.

[11] 4,030,562

[45] June 21, 1977

[54] MOTOR AND PEDAL PROPELLER CYCLE

[75] Inventors: Peter Watson Leighton, Burnley; Charles Patrick Duncan Davidson, Droitwich, both of England

[73] Assignee: Lucas Industries Limited, Birmingham, England

[22] Filed: Jan. 21, 1976

[21] Appl. No.: 650,877

[30] Foreign Application Priority Data

Feb. 27, 1975 United Kingdom ............... 8177/75

[52] U.S. Cl. ............................. 180/34; 180/65 A; 200/61.12
[51] Int. Cl.² ........................................ B62K 11/00
[58] Field of Search ............... 180/34, 65 A, 33 C, 180/31; 200/61.12

[56] References Cited

UNITED STATES PATENTS

| 3,713,502 | 1/1973 | Delaney et al. | 180/65 A |
| 3,773,131 | 11/1973 | Jaulmes | 180/34 |
| 3,827,519 | 8/1974 | Snider | 180/65 A |
| 3,939,932 | 2/1976 | Rosen | 180/33 C |

FOREIGN PATENTS OR APPLICATIONS

| 785,882 | 5/1968 | Canada | 200/61.12 |
| 870,657 | 12/1941 | France | 180/34 |
| 915,600 | 7/1946 | France | 180/34 |
| 893,838 | 2/1944 | France | 180/34 |

Primary Examiner—Kenneth H. Betts

[57] ABSTRACT

An electrically assisted pedal cycle including a frame rotatably mounting a ground engaging wheel. A pedal shaft is supported by the frame with its axis extending transverse to the plane of the frame, the shaft being supported for rotational movement and limited axial movement relative to the frame. A coupling is provided whereby rotation of the shaft relative to the frame at least in one direction can be transmitted to the ground engaging wheel to propel the cycle. A screw arrangement is incorporated whereby rotation of the shaft in the one axial direction moves the shaft axially relative to the frame in one axial direction. An electrical switch is operated by such axial movement of the shaft relative to the frame and the electrical switch is associated with an electric motor and associated power source which are carried by the frame to prevent energization of the electric motor until the electrical switch is operated by the axial movement of the shaft. The electric motor is coupled to the ground engaging wheel so that when energized, the motor can drive the ground engaging wheel so as to assist the rider in propelling the cycle.

14 Claims, 3 Drawing Figures

MOTOR AND PEDAL PROPELLER CYCLE

This invention relates to an electrically assisted pedal cycle, particularly, but not exclusively a bicycle.

A cycle according to the invention includes a frame, a ground engaging wheel rotatably mounted on the frame, a pedal shaft supported by the frame with its axis extending transverse to the plane of the frame, the shaft being supported for rotational movement and limited axial movement relative to the frame, coupling means whereby rotation of the shaft relative to the frame at least in one direction can be transmitted to said ground engaging wheel to propel the cycle, means operable by rotation of the shaft in said one direction to move the shaft axially relative to the frame in one axial direction, electrical switch means operable by axial movement of the shaft relative to the frame in said one axial direction, an electric motor and associated power source carried by the frame, the electric motor being capable of driving said ground engaging wheel, and said electrical switch means being so associated with the electric motor and its associated power source that energisation of the electric motor is dependent upon operation of said electrical switch means.

Desirably resilient means acts on said pedal shaft so as to urge the pedal shaft to move in an axial direction opposite to said one axial direction.

Preferably said pedal shaft is coupled to said ground engaging wheel by way of a second shaft rotatably supported by the frame, and a non-extensible, endless flexible member constituting a driving connection between said second shaft and said ground engaging wheel, said pedal shaft being capable of limited rotational movement relative to said second shaft, where after said second shaft rotates with said pedal shaft and said means causing said axial movement of said pedal shaft during said limited rotational movement of said pedal shaft relative to said second shaft.

Desirably said second shaft is hollow, and said pedal shaft extends through the second shaft coaxially therewith.

Conveniently said means comprises mating helical screw threads on the exterior of the pedal shaft and the interior of said second shaft respectively.

Alternatively, said means comprises a cam arrangement on said pedal shaft and said second shaft, said second shaft being held against axial movement in said one axial direction relative to the frame.

Desirably said resilient means comprises a torsion spring acting between said pedal shaft and said second shaft said torsion spring being stressed by the relative rotation of the pedal shaft and the second shaft which results in said axial movement of said pedal shaft in said one axial direction.

Preferably said electrical switch means is an electrical switch supported by the frame, the pedal shaft carrying a switch operating member cooperating with said switch means.

Preferably said electrical switch is a normally closed switch, the switch being permitted to achieve its closed position by movement of the pedal shaft in said one axial direction, closure of said switch permitting energisation of said electric motor.

Desirably movement of said pedal shaft in said one axial direction displaces said switch operating member from the electrical switch so that there is no contact between the operating member and the switch while the pedal shaft is at the limit of its axial movement in said one axial direction.

Preferably the electric motor can drive said ground engaging wheel by way of said second shaft.

Desirably the electric motor is coupled to said second shaft by way of a free-wheel mechanism so that said shaft, and therefore the ground engaging wheel, can overrun the motor.

Preferably the pedal shaft, and the second shaft are journalled for rotation in a casing secured to the frame, the casing also carrying the electric motor.

The invention further resides in a drive arrangement for an electrically assisted pedal cycle, the drive arrangement including a casing supporting an electric motor, a pedal shaft journalled for rotation in the casing, a second shaft also journalled for rotation in the casing, the pedal shaft being capable of limited axial, and rotational movement relative to the second shaft, means for moving the pedal shaft in one axial direction as a result of relative rotational movement between the pedal shaft and the second shaft in one rotational direction, and electrical switch means operable in response to axial movement of the pedal shaft in said one axial direction.

Figure 2:
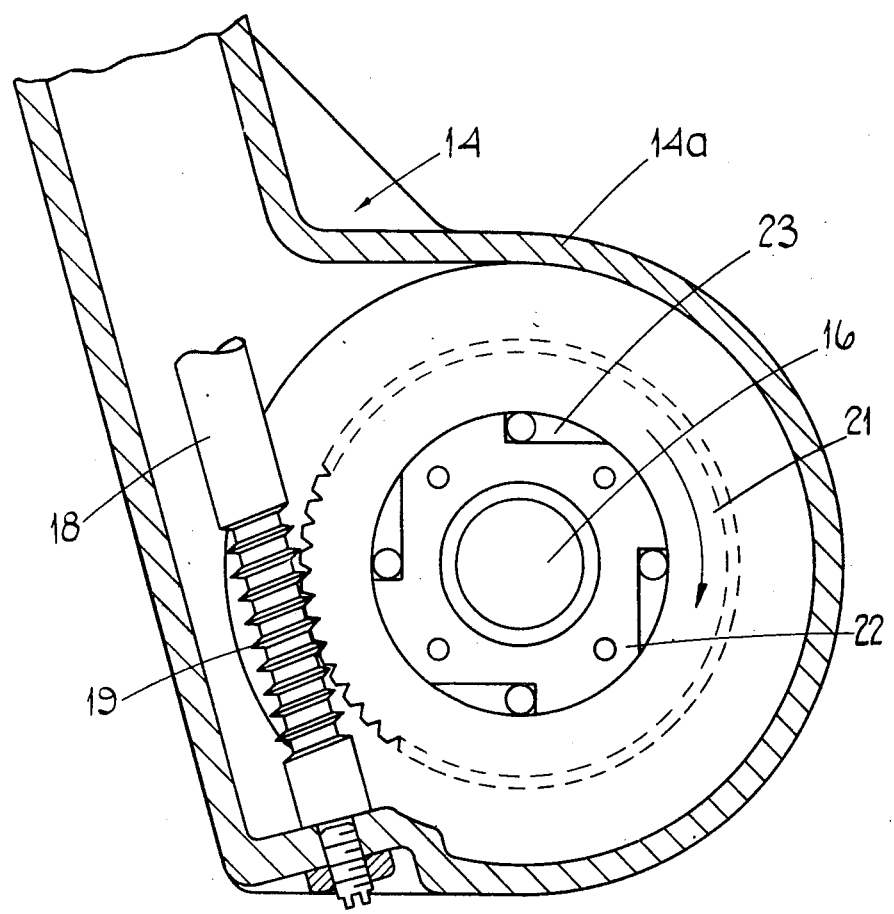
Figure 3:
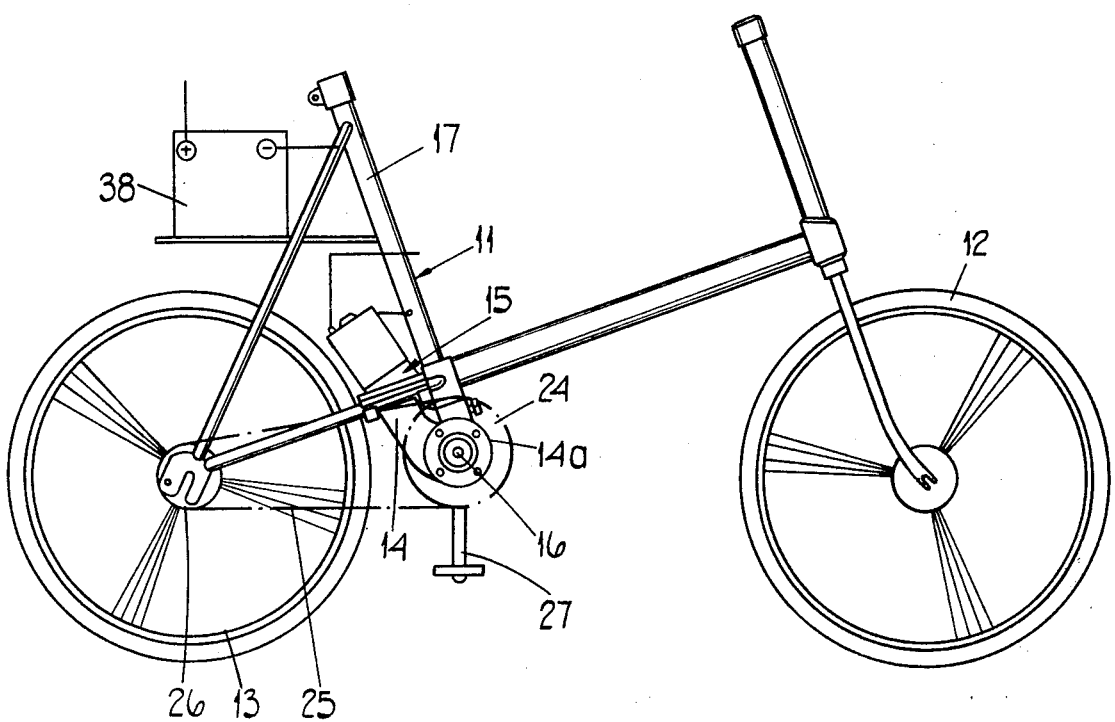

One example of the invention is illustrated in the accompanying drawings wherein, FIG. 1 is an axial sectional view of part of a drive arrangement for an electrically assisted pedal bicycle, FIG. 2 is a sectional view on the line A-A in FIG. 1, and FIG. 3 is a diagrammatic side elevational view of a bicycle incorporating the drive arrangement shown in FIGS. 1 and 2.

Referring to the drawings, the bicycle includes a frame 11 constructed for the most part from metal tube. Rotatably mounted on the frame are first and second ground engaging wheels 12, 13 the wheel 12 being steerable by way of handle bars (not shown) of the frame 11, and the wheel 13 being a driving wheel.

Part of the frame 11 which, in a conventional bicycle, supports the pedal assembly of the bicycle is defined by part of the casing of a drive unit 14 carrying an electric motor 15. The drive unit 14 includes a casing 14a in which is rotatably mounted a pedal shaft 16 extending transversely of the frame 11, the pedal shaft 16 at its opposite axial ends projecting from the casing 14a. A pair of rear frame tube members extending towards the wheel 13 are clamped to the casing 14a as is an upright frame member 17 which in use supports the saddle of the bicycle.

The output shaft 18 of the electric motor 15 carried by the casing 14a extends downwardly towards the shaft 16, and carries a worm gear 19 meshing with a moulded synthetic resin pinion 21 encircling the shaft 16. The pinion 21 is supported on a hollow shaft 22 through which the pedal shaft 16 extends, the shafts 16 and 22 being coaxial. The pinion 21 is coupled to the shaft 22 by way of a free-wheel mechanism 23 whereby rotation of the pinion 21 in one direction drives the shaft 22 in the same direction, while permitting the shaft 22 to move in said one rotational direction relative to the pinion 21. One end of the shaft 22 lies within the casing 14a, and the opposite end of the shaft 22, the end remote from the pinion 21, projects from the casing 14a, transversely of the frame of the bicycle, and fixedly secured thereto a chain wheel 24. The chain wheel 24 is coupled way of an endless, flexible, non-extensible chain 25 to a sprocket 26 coaxial with the ground engaging rear wheel 13. The sprocket 26 can be connected directly to the wheel 13, or can be connected thereto by way of a hub gear mechanism. It will be understood, that the electric motor can drive the pinion 21, in one rotational direction, the rotation of the pinion 21 will be transmitted by the free-wheel mechanism 23 to the shaft 22, and the rotation of the shaft 22 will be transmitted to the wheel 13 to propel the cycle, by way of the chain wheel 24, the chain 25, and the sprocket 26.

The ends of the shaft 16 which project from the casing each carry a pedal assembly (one of which is shown at 27 in FIG. 3). As usual, the pedal assemblies are disposed at 180° to one another around the axis of the shaft 16. As stated above, the shaft 16 extends through the shaft 22, and the shaft 16 is capable of limited axial, and rotational movement relative to the shaft 22. Intermediate its ends the shaft 16 is formed with an external helical screw thread 28 which is in screw threaded engagement with a corresponding helical screw head 29 on the inner surface of a region of the shaft 22. Thus as the shaft 16 is rotated relative to the shaft 22 axial movement of the shaft 16 relative to the shaft 22 will occur in a direction dependent upon the direction of relative rotation. The shaft 22 is held against axial movement relative to the casing 14a in one direction by a bearing 31, and is held against axial movement in the opposite direction by the meshing of the inclined teeth of the pinion 21 with the worm gear 19. Axial movement of the shaft 16 relative to the shaft 22 is limited in one direction by abutment of a shoulder 32 on the shaft 16 with the chain wheel 24, and is limited in the opposite direction by abutment of a shoulder 33 with a corresponding shoulder on the inner surface of the shaft 22. It will be understood that when the shaft 16 reaches either of its limits of axial movement relative to the shaft 22 then during further rotation of the shaft 16 the shaft 22 will rotate with the shaft 16.

Secured to the shaft 16 intermediate the inner end of the shaft 22 and the opposite wall of the casing 14a is a disc 34. The disc 34 is fixed to the shaft 16 for rotation therewith and is engaged by one end of a torsion spring 35 the opposite end of which engages the shaft 22. The torsion spring 35 urges the shaft 16 to rotate relative to the shaft 22 to a rest position, and thus the spring 35 is stressed during rotation of the shaft 16 relative to the shaft 22 in the opposite direction. Thus when the shaft 16 is released in a situation where the spring 35 is stressed then the shaft 16 will be rotated back to its rest position relative to the shaft 22 and of course this return rotational movement will be accompanied by axial movement of the shaft 16 relative to the shaft 22 by virtue of the screw threads 28, 29.

Secured to the wall of the casing 14a is a normally closed electrical switch 36. The switch 36 includes a plunger 37 which is spring urged towards the disc 34. Depression of the plunger 37 against the action of its spring bias opens the contacts of the switch 36. In the rest position of the shaft 16, to which it is urged by the spring 35, the disc 34 abuts the plunger 37 and holds the plunger 37 in a depressed condition wherein the contacts of the switch 36 are open. Axial movement of the shaft 16 in a direction to move the disc 34 away from the switch 36 disengages the disc 34 from the plunger 37 and permits the switch to return to its normally closed condition.

It will be recognised from the foregoing description that the cycle can be propelled by the rider of the cycle by way of the pedal assemblies in the normal manner. During such operation of the cycle of the rider, when propelling the cycle forwardly, will rotate the shaft 16 in a clockwise direction (with reference to FIGS. 2 and 3) and assuming that the rider is starting from rest then the shaft 16 will be in its rest position relative to the shaft 22, and will be in axial position such that the disc 34 depresses the plunger 37 and opens the switch 36. As the rider commences to rotate the shaft 16 to propel the cycle initial rotational movement of the shaft 16 will take place relative to the shaft 22, since at this stage there is considerable resistance to rotation of the shaft 22, as a result of the inertia of the bicycle. Thus the shaft 16 will rotate relative to the shaft 22 and as a result of this relative rotation there will be a corresponding axial movement of the shaft 16 relative to the shaft 22. This axial movement of the shaft 16 moves the disc 34 away from the switch 36 so permitting the switch 36 to close, and displacing the disc 34 from the plunger 37 so that during continued rotation of the shaft 16 one disc 34 does not bear on the plunger 37. Immediately the shaft 16 reaches the right-hand (with reference to FIG. 1) limit of its axial movement, where the shoulder 32 abuts the chain wheel 24, the shaft 22 will rotate with the shaft 16 and thus the cycle will be propelled forwardly.

Should the rider of the cycle remove driving force from the shaft 16 then whether or not the shaft 22 is still rotating the shaft 16 will be returned in the opposite rotational direction by the shaft 35, relative to the shaft 22, so restoring the shaft 16 to an axial position relative to the shaft 22 wherein the disc 34 abuts, and depresses the plunger 37 opening the switch 36. It will be understood that the sprocket 26 may well be connected to the wheel 13 by way of a free-wheel mechanism so that immediately driving force is removed the shaft 22 may cease to rotate. However, since the spring 35 acts directly between the shaft 16 and the shaft 22 this will not matter, and the shaft 16 will still be returned to its rest position.

Associated with the electric motor 15 is a power source in the form of an electric storage battery 38 carried by the frame of the cycle. The switch 36 is electrically connected in series with a further switch carried on the handle bars of the bicycle, and operable manually by the rider of the bicycle. In a simple arrangement where both the manually operable switch and the switch 36 are well capable of carrying the operating current of the motor 15, then the manually operable switch is a normally open switch, and the manually operable switch and the switch 36 are connected in series between the battery 38 and the motor 15. It will be understood therefore that before the motor 15 can be energised both the manually operable switch and the switch 36 must be closed. The manually operable switch will be closed directly by the rider, but as set out above, in the rest condition of the drive arrangement of the bicycle the switch 36 is held open by the disc 34. Thus even though the manually operable switch is closed the motor 15 will not be energised until the rider starts to pedal the bicycle, that is to say until the rider applies sufficient rotational force to the shaft 16 by way of the pedals to move the shaft 16 axially sufficiently far for the disc 34 to permit the switch 36 to return to its normally closed position. Similarly, even though the rider holds the manualy operable switch while the cycle is in forward motion, if the rider ceases to pedal then the shaft 16 will return to its rest position breaking the motor circuit by opening the switch 36.

In the event that the motor 15 is not operating, or is not operating sufficiently rapidly, in relation to the speed of the bicycles, then the shaft 22 will overrun the pinion 21 by virtue of the free-wheel mechanism so that there is no tendency for the motor to be driven, and more particularly so that the motor and the worm gear 19 and pinion 22 do not exert a resistance to normal pedal operation of the bicycle.

It will be understood that if desired the switch 36 may be replaced by a normally open switch, although in the arrangement shown if a normally open switch is used then the electrical circuit must be modified accordingly, so that energisation of the motor can only occur when the switch is open. Alternatively of course, a normally open switch which is closed by the movement of the disc 34 which permits the switch 36 to close could be utilized. However, in such an arrangement there would always be a rubbing engagement of the disc 34 with the plunger member of the normally open switch and this of course is undersirable from the point of view of excessive wear.

It will be understood that further electrical switches can be incorporated into the electrical circuit, energisation of the motor being dependent upon all of the switches being in a predetermined operative state at the same time. For example, where the shaft 16 is the input member of a hub gear mechanism it may be essential that the hub gear mechanism is not subject to driving force during gear changes. Thus the gear change lever may incorporate a switch which causes the motor 15 to be de-energised during gear change operations.

We claim:

1. An electrically assisted pedal cycle including a frame, a ground engaging wheel rotatably mounted on the frame, a pedalshaft supported by the frame with its axis extending transverse to the plane of the frame, the shaft being supported for rotational movement and limited axial movement relative to the frame, coupling means whereby rotation of the shaft relative to the frame at least in one direction can be transmitted to said ground engaging wheel to propel the cycle, means operable by rotation of the shaft in said one direction to move the shaft axially relative to the frame in one axial direction, electrical switch means operable by axial movement of the shaft relative to the frame in said one axial direction, an electric motor and associated power source carried by the frame, the electric motor being capable of driving said ground engaging wheel, and said electrical switch means being so associated with the electric motor and its associated power source that energisation of the elector motor is dependent upon operation of said electrical switch means.

2. A cycle as claimed in claim 1 wherein resilient means acts on said pedal shaft so as to urge the pedal shaft to move in an axial direction opposite to said one axial direction.

3. A cycle as claimed in claim 1 wherein said pedal shaft is coupled to said ground engaging wheel by way of a second shaft rotatably supported by the frame, and a nonextensible, endless flexible member constituting a driving connection between said second shaft and said ground engaging wheel, said pedal shaft being capable of limited rotational movement relative of said second shaft, whereafter said second shaft rotates with said pedal shaft and said means causing said axial movement of said pedal shaft during said limited rotational movement of said pedal shaft relative to said second shaft.

4. A cycle as claimed in claim 3 wherein said second shaft is hollow and pedal shaft extends through the second shaft coaxially therewith.

5. A cycle as claimed in claim 3 wherein said resilient means comprises a torsion spring acting between said pedal shaft and said second shaft said torsion spring being stressed by the relative rotation of the pedal shaft and the second shaft which results in said axial movement of said pedal shaft in said one axial direction.

6. A cycle as claimed in claim 3 wherein the electric motor can drive said ground engaging wheel by way of said second shaft.

7. A cycle as claimed in claim 3 wherein the electric motor is coupled to said second shaft by way of a free-wheel mechanism so that said second shaft, and therefore the ground engaging wheel, can overrun the motor.

8. A cycle as claimed in claim 3 wherein the pedal shaft, and the second shaft ar journalled for rotation in a casing secured to the frame, the casing also carrying the electric motor.

9. A cycle as claimed in claim 1 wherein said means comprises mating helical screw threads on the exterior of the pedal shaft and the interior of said second shaft respectively.

10. A cycle as claimed in claim 1 wherein said means comprises a cam arrangement on said pedal shaft and said second shaft, said second shaft being held against axial movement in said one axial direction relative to the frame.

11. A cycle as claimed in claim 1 wherein said electrical switch means is an electrical switch supported by the frame, the pedal shaft carrying a switch operating member co-operating with said switch means.

12. A cycle as claimed in claim 11 wherein said electrical switch is a normally closed switch, the switch being permitted to achieve its closed position by movement of the pedal shaft in said one axial direction, closure of said switch permitting energisation of said electric motor.

13. A cycle as claimed in claim 11 wherein movement of said pedal shaft in said one axial direction displaces said switch operating member from the electrical switch so that there is no contact between the operating member and the switch while the pedal shaft is at the limit of its axial movement in said one axial direction.

14. A drive arrangement, for an electrically assisted pedal cycle, including a casing supporting an electric motor, a pedal shaft journalled for rotation in the casing, a second shaft also journalled for rotation in the casing, the pedal shaft being capable of limited axial, and rotational movement relative to the second shaft, means for moving the pedal shaft in one axial direction as a result of relative rotational movement between the pedal shaft and the second shaft in one rotational direction, and electrical switch means operable in response to axial movement of the pedal shaft in said one axial direction in use, to permit operation of the electric motor.

* * * * *